C. E. BONNET.
PNEUMATIC THERMOSTAT.
APPLICATION FILED MAY 21, 1909.
974,743.
Patented Nov. 1, 1910.
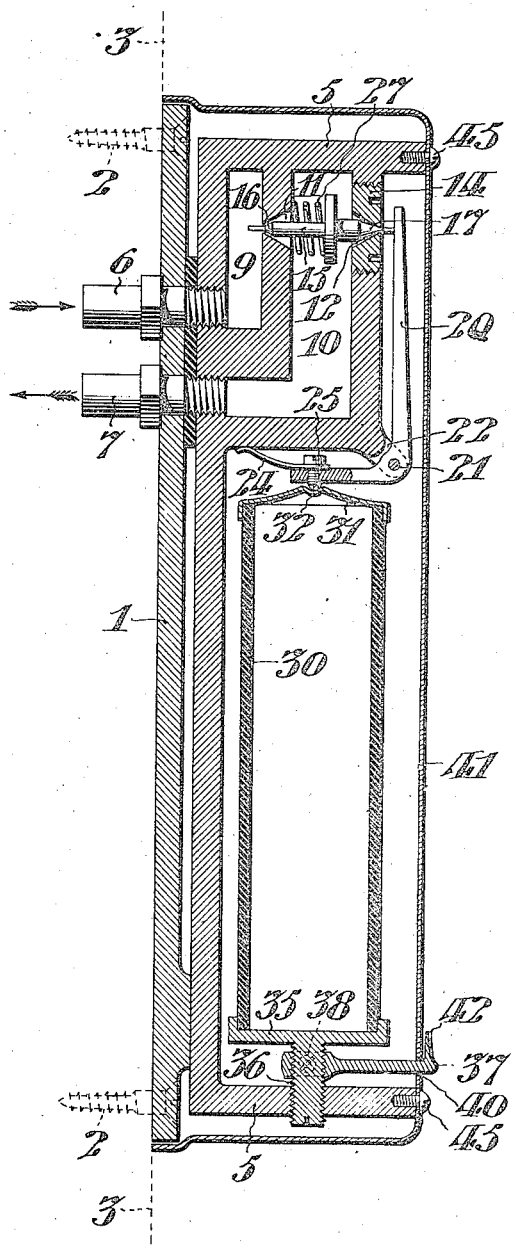
WITNESSES:
Clifton C. Hallowell
Philip W. Lissey
INVENTOR:
CHARLES E. BONNET,
By Arthur E. Paige
Atty.

UNITED STATES PATENT OFFICE.

CHARLES E. BONNET, OF PHILADELPHIA, PENNSYLVANIA.

PNEUMATIC THERMOSTAT.

974,743.  Specification of Letters Patent.  Patented Nov. 1, 1910.

Application filed May 21, 1909. Serial No. 497,561.

*To all whom it may concern:*

Be it known that I, CHARLES E. BONNET, of Philadelphia, in the State of Pennsylvania, have invented a certain new and useful Improvement in Pneumatic Thermostats, whereof the following is a specification, reference being had to the accompanying drawing.

My device is particularly applicable to regulate the temperature local to it, by means of compressed air arranged to operate a motor in accordance with variable movement of a thermostatic element; said motor being, for instance, operatively related to a valve on a steam radiator, or to a damper in a pipe supplying air of predetermined temperature to the room in which the thermostat is located.

As hereinafter described my invention includes a casing connected between a source of compressed air and such a motor, and having opposite conical valve seat ports, respectively arranged to admit compressed air to said temperature controlling motor, and exhaust it from said motor to the atmosphere. A double needle valve having opposite conical ends, being fitted to said ports, so that in accordance with reciprocatory movement of said valve, said ports are alternately opened and closed; when said valve is moved in one direction, air is admitted to operate said motor, and, when said valve is moved in the opposite direction the motor air is exhausted to permit reverse movement of said motor; the movement of said valve being effected in one direction by the thermostatic element and in the opposite direction by a spring.

My invention includes the various novel features of construction and arrangement hereinafter more definitely specified.

The drawing shows a vertical sectional view of a thermostat embodying my improvement.

In said drawing; the plate 1 is provided with suitable means, such as screws 2, for attaching it to the wall 3. The casing 5 which is supported by said plate 1 is conveniently attached to the latter by the tubes 6 and 7 which lead respectively from a source of compressed air and to a temperature controlling motor, the latter being for instance, a diaphragm valve on a steam radiator in the room where the thermostat is located, or a spring pressed diaphragm operatively connected with a damper in the pipe supplying hot air to said room. The chambers 9 and 10 in said casing 5 are respectively in communication with said source of compressed air and motor, and said chamber 10 has respectively opposite inlet and exhaust parts 11 and 12, the former leading from said chamber 9 and the latter leading to the outer atmosphere through an adjustable screw threaded plug 14, whereby the spaced relation of said seats may be adjustably predetermined. The double needle valve 15 has opposite conical ends 16 and 17 respectively fitted to said ports 11 and 12, so that in accordance with reciprocatory movement of said valve, said ports are alternately opened and closed. The lever 20 which is fulcrumed on the pin 21 in the lugs 22 on said casing 5 is arranged to shift said valve 15 to close said inlet port 11 under pressure of the spring 24 which is attached at one end to said lever by the screw 25 and bears upon the casing at its opposite end. The spring 27 arranged in concentric relation with said valve 15 tends to shift the latter to close the exhaust port 12, but is weaker than the spring 24, so that when the latter is unrestrained said lever 20 is shifted to close the inlet port 11. However, said stronger spring 24 is normally restrained to permit said weaker spring 27 to normally maintain said valve 15, closing said exhaust port 12 in the position shown in the drawing, by the thermostatic element including the cylindrical tube of hard rubber 30, having the metallic cap 31 recessed at 32 so as to pivotally engage the lower end of said screw 25. Said thermostatic tube 30 may be adjusted in its relation to the lever 20 and the springs aforesaid, by means arranged to raise and lower said tube 30, including the metallic base 35 which supports said tube 30, and has the screw 36 fitted in the base flange of the casing 5. Said base 35 may be conveniently raised and lowered by the index lever 37 which is threaded at its inner end to fit said screw 36, and is adjustably and detachably connected therewith by the set screw 38. The free end of said lever extends through the slot 40 in the cover 41 and has the index point 42 extending in co-operative relation with a suitable scale of temperature graduations upon the exterior of said cover, so proportioned and arranged that said valve is caused to operate at different temperatures in accordance with the adjustment of said lever 37 with respect to said temperature scale. Said cover 41 is conveniently formed of pressed sheet metal perforated to permit access of the atmosphere to the thermostatic element aforesaid, and is detachably connected with said casing 5 by means of the screws 45.

The device above described operates as follows:—In the position shown in the drawing the exhaust port 12 being closed and the inlet port 11 opened, compressed air is admitted through the tubes 6 and 7 to the temperature controlling motor connected with the latter so as to hold said motor in the desired position to maintain the temperature corresponding with the position of the lever 37. However, if the temperature in the room containing said device becomes cooler, said tube 30 shortens and permits the spring 24 to operate the lever 20 to gradually open the exhaust port 12 and close the inlet port 11, thus permitting the compressed air to be exhausted from the motor connected with the tube 7 with the effect of operating said motor to increase the temperature in said room, wherupon said tube 30 expands and restores the other elements of the device to the normal position shown in the drawings.

Although I have described a convenient embodiment of my invention, wherein the thermostatic element includes a cylindrical tube of hard rubber, it is to be understood that a suitable thermostatic element may be made of other form and material capable of effecting the desired operation of said lever and valve. Therefore, I do not desire to limit myself to the precise details of construction above described as it is obvious that various modifications may be made therein without departing from the essential features of my invention as defined in the appended claims.

I claim:—

1. The combination with a casing having respectively opposite conical valve seat inlet and exhaust ports; of a double needle valve having opposite conical ends respectively fitted to said ports, so constructed and arranged that in accordance with reciprocatory movement of said valve said ports are alternately opened and closed; a lever arranged to shift said valve to close said inlet port; a strong spring arranged to operate said lever to close said port; a weaker spring tending to shift said valve to close said exhaust port; a thermostatic element normally restraining said stronger spring and permitting said weaker spring to normally maintain said valve closing said exhaust port; said thermostatic element including a cylindrical tube of hard rubber having a metallic cap operatively engaging said lever, a metallic base having means arranged to raise and lower it, including a screw fitted in said casing, an index lever adjustably connected with said base, and means detachably connecting said lever and base; whereby, said thermostatic element may be adjusted to operate said valve at different temperatures.

2. The combination with a casing having respectively opposite conical valve seat inlet and exhaust ports; of a double needle valve having opposite conical ends respectively fitted to said ports, so constructed and arranged that in accordance with reciprocatory movement of said valve said ports are alternately opened and closed; a lever arranged to shift said valve to close said inlet port; a strong spring arranged to operate said lever to close said port; a weaker spring tending to shift said valve to close said exhaust port; a thermostatic element normally restraining said stronger spring and permitting said weaker spring to normally maintain said valve closing said exhaust port; said thermostatic element including a hard rubber tube having means operatively engaging said lever, a metallic base having means arranged to raise and lower said tube, including a screw, an index lever connected with said screw, and means detachably connecting said lever and screw; whereby, said thermostatic element may be adjusted to operate said valve at different temperatures.

3. The combination with a casing having respectively opposite conical valve seat inlet and exhaust ports; of a double needle valve having opposite conical ends respectively fitted to said ports, so constructed and arranged that in accordance with reciprocatory movement of said valve said ports are alternately opened and closed; a lever arranged to shift said valve to close said inlet port; a strong spring arranged to operate said lever to close said port; a weaker spring tending to shift said valve to close said exhaust port; a thermostatic element normally restraining said stronger spring and permitting said weaker spring to normally maintain said valve closing said exhaust port; said thermostatic element including a hard rubber member having means operatively engaging said lever, means arranged to raise and lower said member, including a screw fitted in said casing, an index lever connected with said screw, and means detachably connecting said lever and screw; whereby, said thermostatic element may be adjusted to operate said valve at different temperatures.

4. The combination with a casing having respectively opposite conical valve seat inlet and exhaust ports; of a double needle valve having opposite conical ends respectively fitted to said ports, so constructed and arranged that in accordance with reciprocatory movement of said valve said ports are alternately opened and closed; a lever arranged to shift said valve to close said inlet port; a strong spring arranged to operate said lever to close said inlet port; a weaker spring tending to shift said valve to close said exhaust port; a thermostatic element normally restraining said stronger spring and permitting said weaker spring to normally maintain said valve closing said exhaust port; said thermostatic element including a hard rubber member having means operatively engaging said lever, and, means arranged to raise and lower said member; whereby, said thermostatic element may be adjusted to operate said valve at different temperatures.

5. The combination with a casing having respectively opposite valve seat inlet and exhaust ports; of a double needle valve having opposite ends respectively fitted to said ports, so constructed and arranged that in accordance with reciprocatory movement of said valve said ports are alternately opened and closed; a lever arranged to shift said valve to close said inlet port; a strong spring arranged to operate said lever to close said inlet port; a weaker spring tending to shift said valve to close said exhaust port; a thermostatic element normally restraining said stronger spring and permitting said weaker spring to normally maintain said valve closing said exhaust port; said thermostatic element including a hard rubber member having means operatively engaging said lever, and, means arranged to raise and lower said member; whereby, said thermostatic element may be adjusted to operate said valve at different temperatures.

6. The combination with a casing having respectively opposite conical valve seat inlet and exhaust ports; of a double needle valve having opposite conical ends respectively fitted to said ports, so constructed and arranged that in accordance with reciprocatory movement of said valve said ports are alternately opened and closed; a lever arranged to shift said valve to close said inlet port; a strong spring arranged to operate said lever to close said inlet port; a weaker spring tending to shift said valve to close said exhaust port; and, a thermostatic element expansively restraining said stronger spring and permitting said weaker spring to normally maintain said valve closing said exhaust port; said thermostatic element being arranged to expansively thrust said lever to operate it.

7. The combination with a casing having respectively opposite valve seat inlet and exhaust ports; of a double valve having opposite ends respectively fitted to said ports, so constructed and arranged that in accordance with reciprocatory movement of said valve said ports are alternately opened and closed; a lever arranged to shift said valve to close said inlet port; a strong spring arranged to operate said lever to close said inlet port; a weaker spring tending to shift said valve to close said exhaust port; and, a thermostatic element expansively restraining said stronger spring and permitting said weaker spring to normally maintain said valve closing said exhaust port; said thermostatic element being arranged to expansively thrust said lever to operate it.

In testimony whereof, I have hereunto signed my name at Philadelphia, Pa., this eighteenth day of May, 1909.

CHARLES E. BONNET.

Witnesses:
ARTHUR E. PAIGE,
CATHARINE C. CASSIDY.